Feb. 17, 1970      E. A. PRUTTON      3,495,498
DUPLICATING MACHINE
Filed March 6, 1968      3 Sheets-Sheet 3
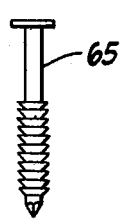
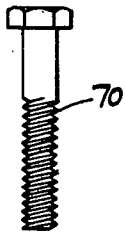
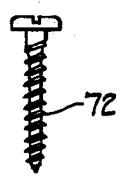
Fig. 4A      Fig. 4B      Fig. 4C
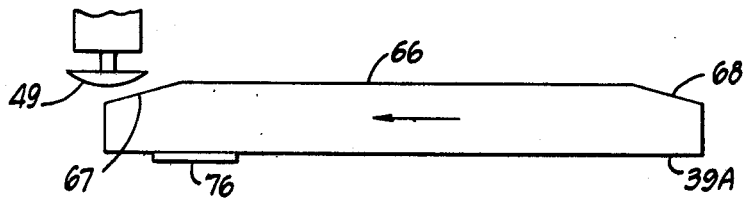
Fig. 5A
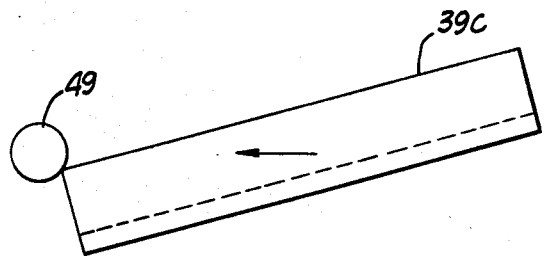      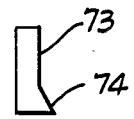
Fig. 5C      Fig. 5B
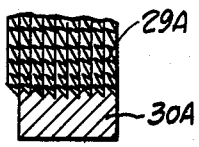      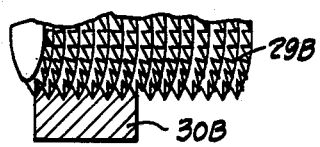      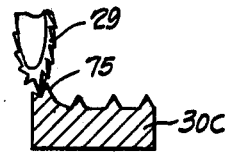
Fig. 6A      Fig. 6B      Fig. 6C
INVENTOR.
EDWARD A. PRUTTON
BY *Louis K. Granger*
ATTORNEY

United States Patent Office 3,495,498
Patented Feb. 17, 1970

3,495,498
DUPLICATING MACHINE
Edward A. Prutton, Parma Heights, Ohio, assignor to Prutton Corporation, a corporation of Ohio
Filed Mar. 6, 1968, Ser. No. 710,793
Int. Cl. B23c 3/28, 3/32; B23d 1/30
U.S. Cl. 90—11.5                                    17 Claims

ABSTRACT OF THE DISCLOSURE

The disclosure shows a duplicating machine especially for making planetary thread rolling dies. A thread form is milled on a cylindrical surface by a rotating cutter on a cross slide of a machine tool. The cross slide is controlled by a pattern and tracer assembly with the pattern being linear to establish the cylindrical form on the workpiece. A work cam rotated directly in accordance with the rotation of the work spindle controls both a sine bar to move the carriage and controls a longitudinal path movement of the linear pattern. Cams and many other shapes may be cut in the work spindle, as well as thread rolling forms.

---

The above disclosure is not to be considered limiting on the hereinafter appended claims. Instead, it is merely one example and is not a complete disclosure of all objects, uses and applications of the invention.

BACKGROUND OF THE INVENTION

There are two general forms of thread rolling machines to produce threads on an object such as a bolt or screw, the flat die type and the planetary die type. In a machine with flat dies the advantage is that the dies are easier to produce but they must reciprocate back and forth so that the return stroke is unproductive in rolling threads and the machine has considerable vibration and wear because of the start-stop reciprocation. In the planetary thread rolling type the disadvantage has been the increased cost of the dies, but the advantage lay in the fact that a circular rotating platten with a series of cylindrical dies on the periphery could continuously roll threads on workpieces while rotating in one direction and there was no lost motion because there was no unproductive return stroke. Also, there was less vibration and wear because of this continuous rotary motion without any return motion.

The extra cost in making the planetary thread rolling dies was because the dies were on a cylindrical surface rather than a planar surface and this considerably increased the complexity of the machinery making the dies. Thread milling machines have been used which had the general appearance of a T-lathe or faceplate lathe with a short longitudinal bed movement and a longer transverse slide movement. These machines had the disadvantage that they could cut only a truly cylindrical surface, not on a variable radius workpiece. Also, in the prior art machines there was no satisfactory means for controlling the movement of the milling cutter in accordance with any master pattern or template to produce in the workpiece variations such as the lead-on and lead-off or a variation to produce a point on the end of the screw to be formed by the planetary die. This meant that special planetary dies to produce these thread forms had to be made by skilled workmen working slowly and manually controlling the machine tool which made the planetary thread rolling die.

An object of the invention is to produce a duplicating machine which will utilize a pattern and tracer to control a milling cutter to produce a thread form on a planetary thread rolling die workpiece.

Another object of the invention is to provide a duplicating machine wherein a flat or linear pattern controls movement of a tool to form or cut a cylindrical workpiece.

Another object of the invention is to provide a duplicating machine which is extremely versatile and will control a tool by a pattern and tracer and by a work cam and sine bar to cut a variety of workpieces such as disc cams, drum cams, face cams, as well as planetary thread rolling dies having lead-on and lead-off or a shape to form a pointed screw.

SUMMARY OF THE INVENTION

The invention may be incorporated in a duplicating machine comprising in combination, a frame, a work spindle journalled on said frame on a longitudinal axis, a motor to drive said work spindle, first and second slides movable longitudinally and perpendicularly of the longitudinal axis, respectively, and one carrying the other thereof, a servomotor connected to move said carried slide perpendicular to said longitudinal axis, a toolholder on said carried slide to cooperate with a workpiece in said work spindle, drive means including a work cam rotated at a speed having a determinable ratio relative to that of the work spindle, pattern holding means carried relative to said frame, a tracer body having a tracer finger for cooperation with a pattern in said pattern holding means, motive means to relatively move said pattern holding means and said tracer body along a path in accordance with movement of said work cam, control means interconnecting said tracer body and said servomotor to control the movement of said carried slide in accordance with the movement of said tracer finger relative to said tracer body, and means mounting said tracer body for a follow-up movement perpendicular to said path in accordance with motion of said carried slide perpendicular to said longitudinal axis, whereby a contour on a generally linear pattern in the pattern holding means may be duplicated on a cylindrical surface of a rotating workpiece in said work spindle.

Other objects and a fuller understanding of this invention may be had by referring to the following description and claims, taken in conjunction with the accompanying drawings, in which:

FIGURE 4 shows several thread forms which may be produced by planetary thread die workpieces made in accordance with this invention;

FIGURE 5 shows different forms of patterns used with the present machine; and

FIGURE 6 shows different milling cutters and planetary thread die workpieces made by the present machine.

DESCRIPTION OF PREFERRED EMBODIMENT

Figure 1:
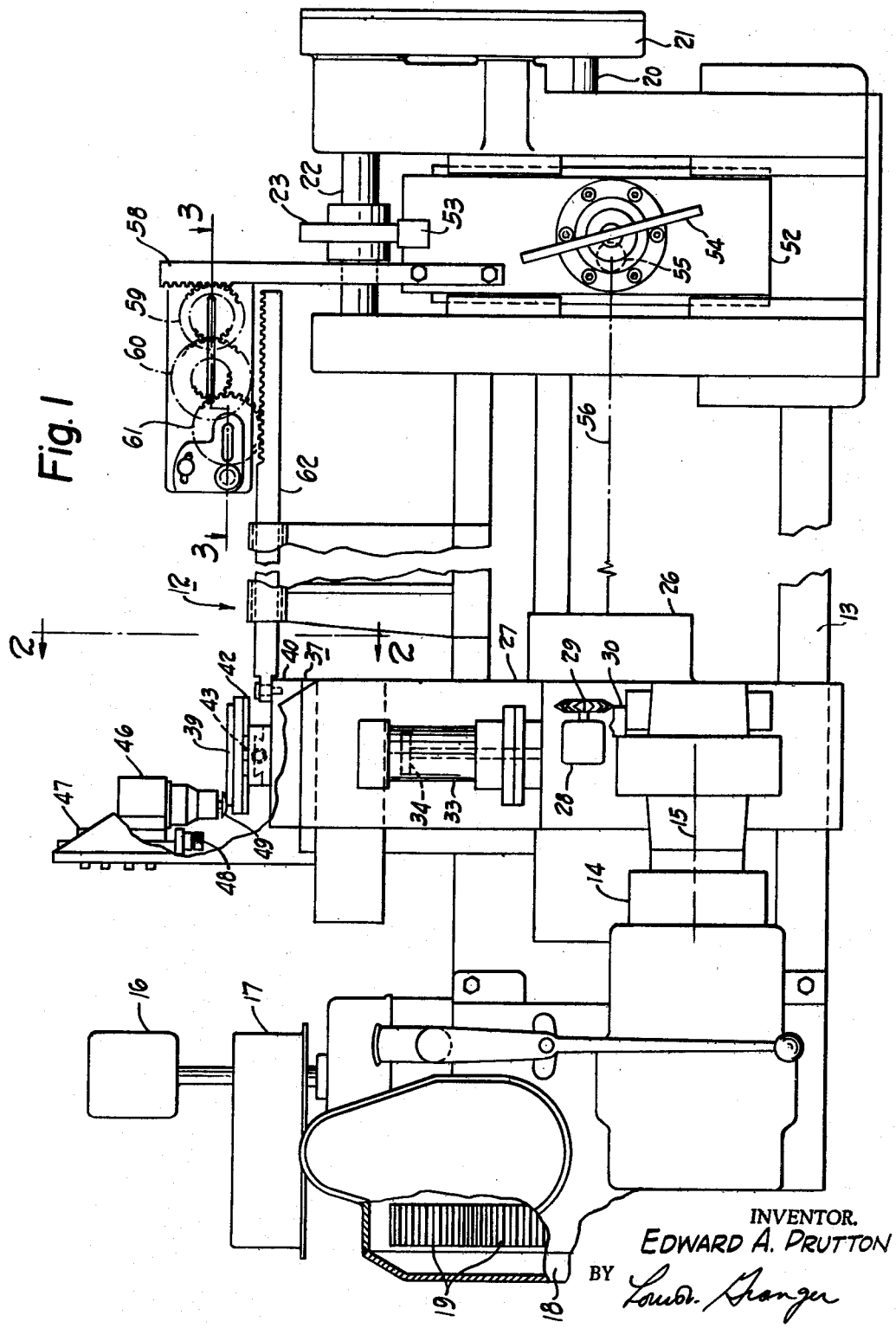
FIGURE 1 is a plan view of a duplicating machine incorporating the invention.
Figure 2:
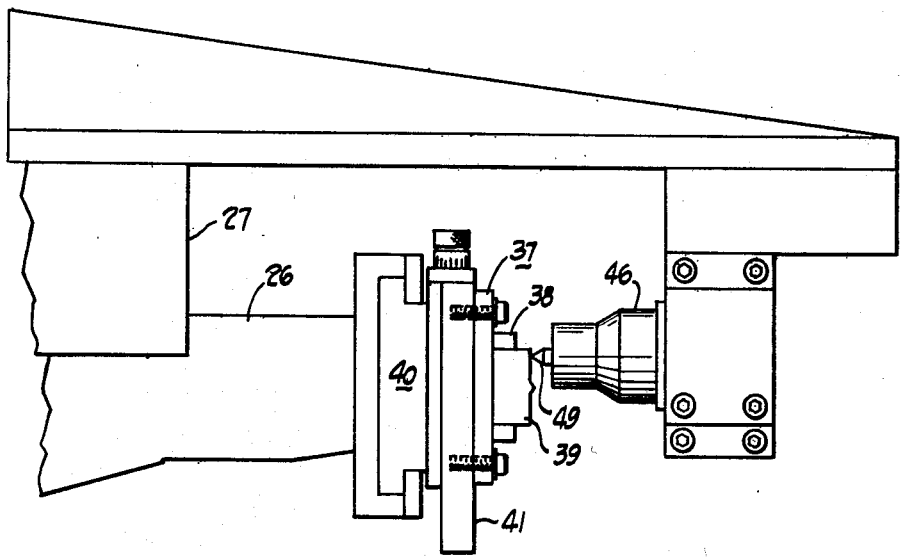
FIGURE 2 is a sectional view on line 2—2 of FIGURE 1.
Figure 3:
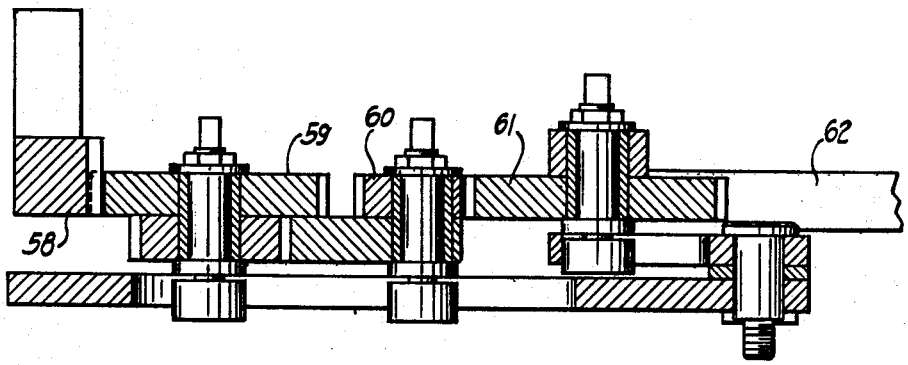
FIGURE 3 is a sectional view on line 3—3 of FIGURE 1.

The FIGURES 1, 2 and 3 show a duplicating machine 12 incorporating the invention. This disclosure is of only one form which the invention may take and is not to be limited thereby but only limited by the hereinafter appended claims. The duplicating machine 12 includes a frame 13 having a work spindle 14 journalled on the frame 13 for rotation about a longitudinal axis 15. A motor 16 is mounted on the frame 13 and connected through a gear box 17 to drive the work spindle 14 at various speeds. Inside a head stock assembly 18 there is provided drive means including change gears 19 driven from the work spindle 14 and which drive a longitudinal drive shaft 20 parallel to the longitudinal axis 15 and which extends toward the tail stock end of the frame 13. A second gear box 21 contains gears driven by the drive shaft 20 to drive a cam shaft 22. A work cam 23 is fixed on and driven by the cam shaft 22 at a speed having determinable ratio relative to that of the work spindle 14. The work cam 23 and cam shaft 22 have an axis parallel to the longitudinal axis 14.

First and second slides 26 and 27 are slidably journalled relative to the frame 13. In this preferred embodiment, the second slide 27 is carried on the first slide 26 and the first slide 26 is a longitudinal slide or carriage with the second slide 27 being a transverse slide or cross slide. A tool holder is carried on the cross slide 27 and in this case the tool holder is a rotatable milling cutter 29 journalled for rotation on the cross slide 27 and driven by a motor 28. This milling cutter 29 will cooperate with a workpiece 30 clamped in and driven by the work spindle 14. A planetary thread rolling workpiece 30 is shown in FIGURE 1.

A servomotor is formed by a cylinder 33 and enclosed piston 34 and connected to move the carried slide, in this case the second slide 27, perpendicular to the longitudinal axis 15. To accomplish this movement the servomotor 33–34 is connected between the first and second slides 26 and 27. A pattern holder 37 is carried relative to the frame 13 and for convenience is mounted on the rear face of the carriage or first slide 26. The pattern holder 37 includes a clamp 38 to mount a pattern or template 39. The pattern holder 37 also includes a pattern slide 40 which will move longitudinally, a pattern slide 41 which will move vertically and a pattern disc 42 which will rotate on a pivot 43 to permit longitudinal, vertical and rotative movements of the pattern 39 relative to the carriage 26.

A tracer body 46 is mounted on an adjusting slide 47 movable by an adjusting screw 48 on the cross slide 27. The tracer body 46 has a tracer finger 49 with a rounded surface for cooperation with the pattern 39. The tracer body may be hydraulic or fluid, with control conduits, not shown, connecting to and controlling the servomotor 33–34. This mounting of the tracer body 46 on the cross slide 27 establishes a follow-up movement of the tracer body perpendicular to the longitudinal axis 15 in accordance with the motion of the carried cross slide 27 as moved by the servomotor 33–34.

The tail stock end of the frame 13 carries a sine bar slide 52 slidably journalled for movements perpendicular to the longitudinal axis 15. A cam follower 53 cooperates with the work cam 23 and is journalled on the sine bar slide 52 to laterally move this sine bar slide 52. A sine bar 54 is angularly adjustably mounted on the slide 52 and cooperates with a sine bar follower 55 which is connected by a link illustrated by reference numeral 56 to longitudinally move the carriage or first slide 26 in accordance with the angular position of the sine bar 54 and the movement of sine bar slide 52.

Motive means relatively moves the pattern 39 and the tracer body 46. This motive means includes a first rack 58 fixed to the sine bar slide 52 to move perpendicularly and which cooperates with gears 59, 60 and 61 to longitudinally move a second rack 62 along a path. The second rack 62 is directly connected to the pattern holder 37 to longitudinally move this pattern 39 along this path. In this preferred embodiment this path is parallel to the longitudinal axis 15.

OPERATION

The change gears 19 are driven directly from the work spindle 14 and these, in turn, form a part of the drive means together with the drive shaft 20, the work cam 23 and the sine bar 54 to longitudinally move the carriage or first slide 26. By this means the work cam 23 is driven at a speed having a determinable ratio relative to that of the work spindle 14. In this preferred embodiment the work spindle might rotate between one-sixth and one revolution for each revolution of the work cam 23. This cam 23 might have a 300 degree arc of linear rise and then a 60 degree rapid drop off to the beginning of the rise of the cam. This 300 degree linear rise would provide a linear movement to the sine bar 54 to provide a linear rate of movement to the carriage 26, dependent upon the angle at which the sine bar 54 is adjustably set.

The pattern 39 and tracer 46 control the servomotor 33–34 to control the cross slide 27 and the tool or milling cutter 29. The pattern 39 receives movement along its path, in this case parallel to the longitudinal axis 15, in accordance with the rotation of the work spindle 14, via the work cam 23 and the racks 58 and 62.

The machine 12 is quite versatile and may be used for many different machining functions. To cut a workpiece which will be a disc cam, the sine bar 54 may be set at a zero degree angle, namely, an angle perpendicular to the longitudinal axis 15. In such case, the motion produced by the work cam 23 does not move the carriage 26, instead the motion is imparted only through the racks 58 and 62 to the pattern 39. This pattern 39 may have a desired slope relative to the longitudinal path established by the pattern slide 40. This movement will control the tracer 46 and, hence, control the servomotor 33–34 to have the cutter 29 produce the desired radially varying shape on the disc cam workpiece. In such case, of course, the width of the cutter would preferably be greater than the width of the disc cam workpiece to be cut, rather than being just a single point cutter 29 as shown in FIGURE 1. In the above case the changing transverse dimension of the pattern 39 would establish a variable radius on the workpiece.

The machine 12 may be used to cut a workpiece which will be a drum cam. In this case the pattern 39 is established as a straight bar parallel to the longitudinal axis 15. In this way there is no signal given to the tracer 49–46. Alternatives are to lock the tracer 49–46 in one position, or to lock the servomotor 33–34 in one position, or disable the motive means, as by removing one of the gears 59–61. The entire form to control the workpiece is then placed in the work cam 23. This controls the sine bar 54 and controls the movement of the carriage 26 so as to give a desired longitudinally changing contour on the drum cam workpiece as the work spindle 14 and workpiece rotates. One can obtain any change in lead on the workpiece merely by changing the contour on the work cam 23.

A combination of the disc cam and drum cam may be cut sequentially on a workpiece which will be a face cam to control two separate cam followers.

The machine 12 may also be used, especially in this preferred embodiment, to cut a workpiece 30 which will be used as a planetary thread rolling die. This workpiece 30 will have a cylindrical outer surface which is being worked or cut by the milling cutter 29. In the following examples and in the drawing, only an inner planetary die workpiece with external thread form is shown, but those skilled in the art will readily understand how the machine may be used to cut a planetary die workpiece which is either the inner or the outer planetary die.

If a ring grooved nail 65 is to be produced as shown in FIGURE 4A, this would be an operation similar to the disc cam cutting operation and the sine bar 54 would be set at zero degrees for zero motion of the carriage 26. The only motion required would be that of the cross slide 27. FIGURE 5A illustrates a plan view of a pattern 39A which has a longitudinally parallel tracer contacting surface 66. A multiple point milling cutter 29A may be used, if desired, see FIGURE 6A, to cut the necessary ring groove rolling form in the workpiece 30A. The tracer finger 49 will contact the tracer contacting surface 66 as the pattern 39A is moved to the left as viewed in FIGURE 5A. A lead-on surface 67 and a lead-off surface 68 may be provided on the patern 39A so that a corresponding radially changing lead-on and lead-off will be formed in the generally cylindrical outer surface of the workpiece being cut by the milling cutter 29A.

If a conventional screw thread 70 is to be formed on a workpiece as shown in FIGURE 4B then motion is required of the carriage 26. Accordingly, the sine bar 54 is established at the proper angle dependent upon the desired lead in the screw thread 70. Again, a multiple point cutter 29B may be used if desired and it should have enough axial width to traverse across the face of the workpiece 30B, see FIGURE 6B, as the work spindle 14 makes its arcuate movement. A single point cutter 29 may be used if desired, with a single groove being milled for each arcuate rotation of the work spindle 14 and work cam 23. The machine would be reset for the next successive pass of the work cutter by relatively shifting the cutter and workpiece the distance of one pitch of the threads before start of the next cut. In either case of a single point or multiple groove cutter, the latter shown at 29B in FIGURE 6B, the cutter should be set at an angle corresponding to the pitch of the thread form desired in the workpiece 30B. The pattern used with this milling cutter 29B can again be the pattern 39A with the axially parallel tracer contacting surface 66. Also, the lead-on and lead-off surfaces 67 and 68 may be used to provide the necessary lead-on and lead-off in the planetary thread rolling die workpiece 30B.

If a pointed screw thread 72, as shown in FIGURE 4O is desired, such as for a wood screw or a sheet screw, a pattern 39C may be used as shown in the elevational view of FIGURE 5C. This shows a flat planar tracer contacting surface 73 plus an angled contacting surface 74 as best shown in the end view of FIGURE 5B. FIGURE 5C shows that the pattern 39C is rotated about the pivot 43 to be at an angle relative to the horizontal equal to the pitch angle desired on the thread rolling die workpiece 30C, shown in FIGURE 6C. As the pattern 39C travels to the left as viewed in FIGURE 5C, the tracer finger 49 will engage first the planar surface 73 and next engage the angled contacting surface 74. This will control the servomotor 33–34 to move the cross slide rearwardly and, hence, the single point cutter 29 will move away from the workpiece 30C to form the rise 75, FIGURE 6C. Successive passes will be made with the milling cutter 29 and the workpiece 30C relatively moved between passes the distance of one thread pitch.

One can also obtain deeper threads at the finish of the planetary die relative to those at the start of the planetary die by inserting a shim 76, FIGURE 5A, at the appropriate end of the pattern 39. This is shown at the left end of pattern 39A of FIGURE 5A and will cause the cross slide to retract further, therefore, cuting less deeply at the start of the planetary die relative to the depth of the threads at the finish of the rotary die. This provides for a gradually increasing depth of threads rolled by the planetary die in the screw 65, 70 or 72 as the thread form is rolled therein.

The gear ratio in the gearing 59–61 may readily be changed by changing the gears and this permits changing the movement of the pattern 39 relative to the movement of the carriage 26, dependent upon which one of the many different types of machining operations is being performed.

The tracer body 46, being mounted on the cross slide 27 is a means to establish a follow-up movement of the tracer body perpendicular to the path of movement of the pattern 39. In this preferred embodiment the path is parallel to the longitudinal axis 15 and the follow-up movement is perpendicular thereto, namely, directly in accordance with movement of the cross slide 27.

While I have illustrated and described a preferred embodiment of my invention, it will be understood that this is by way of example only and not to be construed as limiting.

What is claimed is:
1. A duplicating machine comprising in combination, a frame,
  a work spindle journalled on said frame on a longitudinal axis,
  a motor to drive said work spindle,
  first and second slides movable longitudinally and perpendicularly of the longitudinal axis, respectively, and one carrying the other thereof,
  a servomotor connected to move said carried slide perpendicular to said longitudinal axis,
  a toolholder on said carried slide to cooperate with a workpiece in said work spindle,
  drive means including a work cam rotated at a speed having a determinable ratio relative to that of the work spindle,
  pattern holding means carried relative to said frame,
  a tracer body having a tracer finger for cooperation with a pattern in said pattern holding means,
  motive means to relatively move said pattern holding means and said tracer body along a path in accordance with movement of said work cam,
  control means interconnecting said tracer body and said servomotor to control the movement of said carried slide in accordance with the movement of said tracer finger relative to said tracer body,
  and means mounting said tracer body for a follow-up movement perpendicular to said path in accordance with motion of said carried slide perpendicular to said longitudinal axis,
  whereby a contour on a generally linear pattern in the pattern holding means may be duplicated on a cylindrical surface of a rotating workpiece in said work spindle.
2. A duplicating machine as set forth in claim 1, including an adjustable sine bar on said frame,
  means connecting said drive means to move said sine bar on said frame perpendicular to said longitudinal axis,
  and a sine bar follower cooperating with said sine bar and connected to move said first slide.
3. A duplicating machine as set forth in claim 1 wherein said motive means moves said pattern holding means along said path.
4. A duplicating machine as set forth in claim 1 including a rotatable cutter in the toolholder,
  said work spindle being driven at a relatively slow speed relative to the rate of travel of the first slide to mill a thread form in a workpiece carried in the work spindle,
  with the tracer body and finger controlling lateral movement of the second slide for a variable radius contour in the thread form being milled.
5. A duplicating machine as set forth in claim 1 wherein said drive means includes a longitudinal drive shaft journalled in said frame and includes change gears to drive the drive shaft directly from said work spindle.
6. A duplicating machine as set forth in claim 1 including first and second racks in said motive means,
  said first rack moved directly with said work cam transversely of said longitudinal axis,
  means journalling said second rack for movement along said path,
  pinion means interengaging said racks,
  and means moving said pattern holding means along said path by said second rack.
7. A duplicating machine as set forth in claim 1 wherein said pattern holding means is mounted on said first slide to be longitudinally movable therewith.
8. A duplicating machine as set forth in claim 1 including means in said pattern holding means to adjust the position of a pattern longitudinally, vertically and rotatively.

9. A duplicating machine as set forth in claim 1 wherein said tracer body mounting means is mounted on said second slide and said pattern holding means is mounted on said first slide.

10. A duplicating machine as set forth in claim 1 wherein said second slide is carried on said first slide,
said tracer body mounting means is on said second slide and said pattern holding means is on said first slide to be movable therewith and, also, to be moved in accordance with movement of said work cam.

11. A duplicating machine as set forth in claim 2 wherein said sine bar is moved directly at a speed having a determinable ratio relative to that of the work spindle.

12. A duplicating machine as set forth in claim 2 including a sine bar slide journalled on said frame for sliding movements perpendicular to said longitudinal axis,
and means mounting said sine bar on said sine bar slide for cooperation with said sine bar follower.

13. A duplicating machine as set forth in claim 12 including a cam follower on said sine bar slide cooperating with said work cam to move said sine bar slide.

14. A duplicating machine as set forth in claim 2 including means journalling said work cam on said frame on an axis parallel to said longitudinal axis,
and a cam follower cooperating with said work cam to laterally move said sine bar.

15. A duplicating machine as set forth in claim 1 wherein said motive means includes first and second racks,
said first rack moved directly with said work cam transversely of said longitudinal axis,
means slidably journalling said second rack for movement along said path,
gear means interengaging said racks,
means moving said pattern holding means along said path by said second rack,
and said pattern holding means being mounted on said first slide to be selectively longitudinally movable therewith and with said second rack.

16. A duplicating machine as set forth in claim 2 including a sine bar slide journalled on said frame for sliding movements perpendicular to said longitudinal axis,
means mounting said sine bar on said sine bar slide for cooperation with said sine bar follower,
means journalling said work cam on said frame on an axis parallel to said longitudinal axis, and
a cam follower on said sine bar slide cooperating with said work cam to move said sine bar slide wherein said sine bar is moved directly at a speed having a determinable ratio relative to that of the work spindle.

17. A duplicating machine as set forth in claim 2 wherein said motive means includes first and second racks,
said first rack moved directly with said work cam transversely of said longitudinal axis,
means slidably journalling said second rack for movement along said path,
gear means interengaging said racks,
means moving said pattern holding means along said path by said second rack,
said pattern holding means being mounted on said first slide to be selectively longitudinally movable therewith and with said second rack,
a sine bar slide journalled on said frame for sliding movements perpendicular to said longitudinal axis,
means mounting said sine bar on said sine bar slide for cooperation with said sine bar follower,
means journalling said work cam on said frame on an axis parallel to said longitudinal axis,
and a cam follower on said sine bar slide cooperating with said work cam to move said sine bar slide wherein said sine bar is moved directly at a speed having a determinable ratio relative to that of the work spindle.

References Cited
UNITED STATES PATENTS 2,225,409   12/1940   Bromley _____ 82—19

GERALD A. DOST, Primary Examiner

U.S. Cl. X.R.

82—14, 19; 90—62